United States Patent
Nomura et al.

(10) Patent No.: US 8,853,685 B2
(45) Date of Patent: Oct. 7, 2014

(54) OPTICAL SEMICONDUCTOR, OPTICAL SEMICONDUCTOR ELECTRODE USING SAME, PHOTOELECTROCHEMICAL CELL, AND ENERGY SYSTEM

(75) Inventors: Takaiki Nomura, Osaka (JP); Takahiro Suzuki, Osaka (JP); Nobuhiro Miyata, Osaka (JP); Kazuhito Hato, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/575,770

(22) PCT Filed: Mar. 3, 2011

(86) PCT No.: PCT/JP2011/001240
§ 371 (c)(1), (2), (4) Date: Jul. 27, 2012

(87) PCT Pub. No.: WO2011/108271
PCT Pub. Date: Sep. 9, 2011

(65) Prior Publication Data
US 2012/0292618 A1 Nov. 22, 2012

(30) Foreign Application Priority Data
Mar. 4, 2010 (JP) .................. 2010-047426

(51) Int. Cl.
*H01L 29/12* (2006.01)
*C01B 21/082* (2006.01)
*C25B 1/00* (2006.01)
*H01M 8/06* (2006.01)

(52) U.S. Cl.
CPC ............ *H01M 8/0656* (2013.01); *Y02E 60/366* (2013.01); *C01B 21/0821* (2013.01); *C01P 2002/85* (2013.01); *C01P 2002/84* (2013.01); *C01P 2002/77* (2013.01); *C01P 2002/72* (2013.01); *C25B 1/003* (2013.01); *Y02E 60/50* (2013.01); *Y02E 60/364* (2013.01)
USPC ...................... 257/43; 257/E31.015

(58) Field of Classification Search
USPC ................................ 257/43, E31.015
See application file for complete search history.

(56) References Cited

U.S. PATENT DOCUMENTS

| | | | |
|---|---|---|---|
| 2010/0038637 A1* | 2/2010 | Aranami et al. ................ 257/43 |
| 2010/0108502 A1 | 5/2010 | Inoue et al. | |
| 2012/0028141 A1* | 2/2012 | Nomura et al. .............. 429/422 |

FOREIGN PATENT DOCUMENTS

| | | |
|---|---|---|
| CN | 1849413 | 10/2006 |
| JP | 51-123779 | 10/1976 |

(Continued)

OTHER PUBLICATIONS

Elvira Fortunato et al, "Wide-Bandgap High-Mobility ZnO Thin-Film Transistors Produced At Room Temperature" Sep. 27, 2004, American Institute of Physics (pp. 2541-2543).*

(Continued)

*Primary Examiner* — David S Blum
(74) *Attorney, Agent, or Firm* — Hamre, Schumann, Mueller & Larson, P.C.

(57) ABSTRACT

The optical semiconductor of the present invention is an optical semiconductor containing In, Ga, Zn, O and N, and has a composition in which a part of oxygen (O) is substituted by nitrogen (N) in a general formula: $In_{2x}Ga_{2(1-x)}O_3(ZnO)_y$, where x and y satisfy $0.2 < x < 1$ and $0.5 \leq y$. In the general formula, x is preferably 0.5, and furthermore, y is preferably 1 or more and 6 or less, and more preferably 2 or 6. It is preferred that the optical semiconductor of the present invention have a wurtzite crystal structure. The optical semiconductor of the present invention is an excellent optical semiconductor because it has a smaller band gap, can utilize visible light, and has high carrier mobility and thus has high quantum efficiency.

16 Claims, 16 Drawing Sheets

(56) References Cited

FOREIGN PATENT DOCUMENTS

| JP | 2003-024764 | 1/2003 |
|---|---|---|
| WO | 2005/006391 | 1/2005 |
| WO | 2006/103966 | 10/2006 |
| WO | 2007/052512 | 5/2007 |
| WO | 2008/072486 | 6/2008 |

OTHER PUBLICATIONS

Masaya Nakayama et al "Effect of GaO layer on IGZO-TFT Channel" 2010 The Japan society of Applied Physics (p. 21-008).*

Kamata, et al., "Synthesis and photocatalytic activity of gallium-zinc-indium mixed oxynitride for hydrogen oxygen evolution under visible light", Chemical Physics Letters, vol. 470, pp. 90-94, 2009.

Kamata, et al., "Development of gallium-zinc-indium mixed oxynitride photocatalysts designed for water splitting reaction", Proceedings for Session A at the 103$^{rd}$ Meeting of Catalysis Society of Japan, p. 27, 2009—partial translation.

Mikami, et al., "Photocatalytic Activities of $In_2O_3(ZnO)_m$ and $GaInO_3(ZnO)_n$ with laminated structures", Proceedings of Lectures at the 74$^{th}$ Spring Meetings of the Chemical Society of Japan, I, p. 251, Upper Left (2H211), 1998—partial translation.

Luo, et al., "Semiconductor photoelectrodes and their applications in solar energy conversion" Physics, vol. 35, No. 6, pp. 497-501, 2006—Abstract.

* cited by examiner

| Composition | InGaZn$_2$N$_2$O$_2$(y=2) | InGaZn$_6$N$_2$O$_6$(y=6) |
|---|---|---|
| Structure |  ○ Nitrogen ● Oxygen |  ○ Nitrogen ● Oxygen |
| Result of first-principles calculation | Band gap 0.3eV<br>Electronic band structure (InGaZn$_2$O$_2$N$_2$)<br><br>Brillouin zone | Band gap 0.4eV<br>Electronic band structure (InGaZn$_6$N$_2$O$_6$)<br><br>Brillouin zone |

OPTICAL SEMICONDUCTOR, OPTICAL SEMICONDUCTOR ELECTRODE USING SAME, PHOTOELECTROCHEMICAL CELL, AND ENERGY SYSTEM

TECHNICAL FIELD

The present invention relates to an optical semiconductor for decomposing water by irradiation with light, an optical semiconductor electrode and a photoelectrochemical cell each using the same, and an energy system using the photoelectrochemical cell.

BACKGROUND ART

Conventionally, it is known that a semiconductor material that functions as an optical semiconductor decomposes water into hydrogen and oxygen when the semiconductor material is irradiated with light (see, for example, Patent Literature 1). Patent Literature 1 discloses a technique in which an n-type semiconductor electrode and a counter electrode are disposed in an electrolyte and the surface of the n-type semiconductor electrode is irradiated with light, so that hydrogen and oxygen are obtained from the surfaces of both electrodes. Specifically, the use of a $TiO_2$ electrode or the like as the n-type semiconductor electrode is described therein.

However, the band gap of $TiO_2$ (anatase type) is 380 nm. Therefore, the semiconductor electrode disclosed in Patent Literature 1 has a problem in that only about 1% of sunlight can be utilized.

In order to solve this problem, Patent Literature 2 discloses an electrode made of a single crystal $In_zGa_{1-z}N$ (0<z<1), which is a solid solution of GaN (band gap: 365 nm, crystal structure: wurtzite type) and InN (crystal structure: wurtzite type). A gas generator disclosed in Patent Literature 2 uses the single crystal $In_zGa_{1-z}N$ to narrow the band gap of the electrode material, that is, to increase the sunlight utilization efficiency. However, $In_{0.2}Ga_{0.8}N$ (band gap: 500 nm) is the upper limit to which the content of In can be increased in $In_zGa_{1-z}N$. When z is greater than 0.2 in $In_zGa_{1-z}N$, phase separation occurs. Therefore, it is difficult to further reduce the band gap of $In_zGa_{1-z}N$ by increasing the content of In.

As described above, it is difficult to achieve an In-rich composition (a composition with a high content of In) in $In_zGa_{1-z}N$. On the other hand, it is possible to achieve an In-rich composition in an oxide semiconductor containing Ga and In. Patent Literature 3 discloses $InGaO_3(ZnO)_m$ (where m is an integer of 1 to 20) as an oxide semiconductor having an In-rich composition.

CITATION LIST

Patent Literature

Patent Literature 1 JP 51 (1976)-123779 A
Patent Literature 2 JP 2003-024764 A
Patent Literature 3 WO 2008/072486 A1

SUMMARY OF INVENTION

Technical Problem

It is an object of the present invention to achieve an In-rich composition in a single crystal solid solution of GaN and InN and thereby to provide a semiconductor material having a smaller band gap, that is, an optical semiconductor capable of utilizing visible light. It is another object of the present invention to provide an optical semiconductor electrode and a photoelectrochemical cell using the above optical semiconductor. It is still another object of the present invention to provide an energy system using the above photoelectrochemical cell.

Solution to Problem

The present inventors have focused on oxides of indium (In), gallium (Ga) and zinc (Zn) having high carrier mobility and excellent semiconductor characteristics. Specifically, the present inventors have focused on the substitution of oxygen by nitrogen in the oxide semiconductor having an In-rich composition disclosed in Patent Literature 3. That is, the present inventors have focused on the possibility of obtaining a smaller band-gap semiconductor material having a crystalline phase, at least a part of which has a stable wurtzite structure, by forming a solid solution of InN, GaN and ZnO having a wurtzite crystalline phase.

As a result, the present inventors have arrived at the optical semiconductor of the present invention containing In, Ga, Zn, O and N, and having a composition in which a part of O is substituted by N in a general formula: $In_{2x}Ga_{2(1-x)}O_3(ZnO)_y$, where x and y satisfy 0.2<x<1 and 0.5≤y.

The optical semiconductor electrode of the present invention includes: a conductive substrate; and an optical semiconductor layer disposed on the conductive substrate. In the optical semiconductor layer, a junction plane near-field region of the optical semiconductor layer with the conductive substrate is composed of a composition A represented by a general formula: $In_{2x}Ga_{2(1-x)}O_3(ZnO)_y$, where x and y satisfy 0.2<x<1 and 0.5≤y, a surface near-field region of the optical semiconductor layer is composed of a composition B having a composition in which a part of O is substituted by N in the general formula, and a Fermi level of the composition A is higher than a Fermi level of the composition B.

The first photoelectrochemical cell of the present invention includes: an optical semiconductor electrode having: a conductive substrate; and an optical semiconductor layer disposed on the conductive substrate and containing the optical semiconductor of the present invention; a counter electrode connected electrically to the conductive substrate; a water-containing electrolyte in contact with surfaces of the optical semiconductor layer and the counter electrode; and a container containing the optical semiconductor electrode, the counter electrode, and the electrolyte. This photoelectrochemical cell generates hydrogen when the optical semiconductor layer is irradiated with light.

The second photoelectrochemical cell of the present invention includes: an optical semiconductor electrode having a conductive substrate and an optical semiconductor layer disposed on the conductive substrate, wherein in the optical semiconductor layer, a junction plane near-field region of the optical semiconductor layer with the conductive substrate is composed of a composition A represented by a general formula: $In_{2x}Ga_{2(1-x)}O_3(ZnO)_y$, where x and y satisfy 0.2<x<1 and 0.5≤y, a surface near-field region of the optical semiconductor layer is composed of a composition B having a composition in which a part of O is substituted by N in the general formula, and a Fermi level of the composition A is higher than a Fermi level of the composition B; a counter electrode connected electrically to the conductive substrate of the optical semiconductor electrode; a water-containing electrolyte in contact with surfaces of the optical semiconductor electrode and the counter electrode; and a container containing the optical semiconductor electrode, the counter electrode, and the electrolyte. This photoelectrochemical cell generates hydrogen when the optical semiconductor layer is irradiated with light.

The energy system of the present invention includes: the first or second photoelectrochemical cell of the present invention; a hydrogen storage, connected to the photoelectrochemical cell by a first pipe, for storing hydrogen generated in the photoelectrochemical cell; and a fuel cell, connected to the hydrogen storage by a second pipe, for converting hydrogen stored in the hydrogen storage into electricity.

Advantageous Effects of Invention

The optical semiconductor of the present invention is a solid solution of InN, GaN and ZnO having a wurtzite crystalline phase, and has a crystalline phase, at least a part of which has a stable wurtzite structure. In addition, the optical semiconductor of the present invention has an In-richer composition than conventional nitride semiconductors composed of a solid solution of GaN and InN. Therefore, the optical semiconductor of the present invention has a smaller band gap and can utilize visible light. Furthermore, since the optical semiconductor of the present invention has high carrier mobility, it is an excellent semiconductor having high quantum efficiency. For these reasons, the optical semiconductor of the present invention, for example, can utilize sunlight effectively and has optical semiconductor properties with high quantum efficiency.

In the optical semiconductor electrode of the present invention, the composition B having the same composition as the optical semiconductor of the present invention is used as a material for the surface near-field region of the optical semiconductor layer. This allows the optical semiconductor electrode of the present invention to have the same effects as those obtained by the optical semiconductor of the present invention. In addition, the composition A is used for the junction plane near-field region with the conductive substrate of the optical semiconductor layer. The composition A is an oxide containing Ga, In and Zn, in which oxygen is not substituted by nitrogen, and has a higher Fermi level than the composition B. Thus, the optical semiconductor layer containing both the composition A and the composition B has improved charge separation capability. As a result, its quantum efficiency is further improved.

The first and second photoelectrochemical cells of the present invention utilize the optical semiconductor of the present invention. The first and second photoelectrochemical cells of the present invention can improve the quantum efficiency of the hydrogen evolution reaction by irradiation with light by the effects obtained by the optical semiconductor of the present invention. Since the energy system of the present invention is provided with such a photoelectrochemical cell, efficient electric power supply is achieved.

DESCRIPTION OF EMBODIMENTS

First Embodiment

Figure 1:
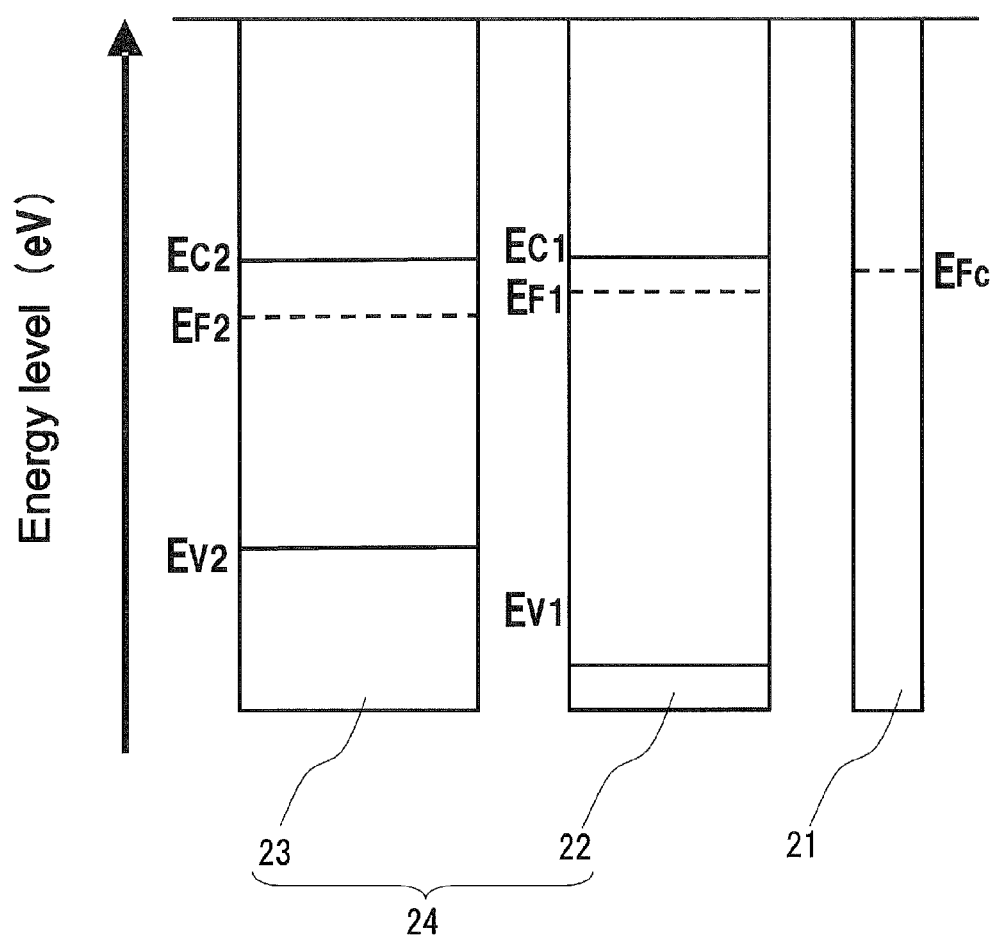
FIG. 1 is a conceptual diagram showing the band structures of a conductive substrate, a surface near-field region of an optical semiconductor layer, and a junction plane near-field region of the optical semiconductor layer with the conductive substrate, before being joined together, which constitute an optical semiconductor electrode according to an embodiment of the present invention.

The optical semiconductor of the first embodiment of the present invention is an optical semiconductor containing In, Ga, Zn, O and N, and has a composition in which a part of O is substituted by N in a general formula: $In_{2x}Ga_{2(1-x)}O_3(ZnO)_y$, where x and y satisfy $0.2 < x < 1$ and $0.5 \leq y$.

The optical semiconductor having such a composition is a solid solution of InN, GaN and ZnO having a wurtzite crystalline phase, and has a crystalline phase, at least a part of which has a stable wurtzite structure. In addition, since this optical semiconductor has an In-rich composition with a high content of In, it has a smaller band gap than conventional optical semiconductors composed of a single crystal solid solution $(In_zGa_{1-z}N)$ of GaN and InN. For these reasons, this optical semiconductor is an optical semiconductor having excellent semiconductor characteristics, and for example, it can utilize sunlight effectively and exhibit optical semiconductor properties with high quantum efficiency.

In the optical semiconductor of the present invention, x is preferably 0.5 in the general formula.

In the case where the optical semiconductor of the present invention has this structure (in the case where it has a composition in which a part of O is substituted by N in the general formula: $In_{2x}Ga_{2(1-x)}O_3(ZnO)_y$, where x and y satisfy x=0.5 and 0.5≤y), an In-rich composition, which cannot be achieved in $In_zGa_{1-z}N$, can be achieved, and the resulting band gap is about 900 nm. Such a band gap is suitable, for example, for water photolysis (an application that requires a band gap with an absorption band edge of 1000 nm or less) because the sunlight utilization efficiency can be increased.

The reasons why it is preferable to satisfy x=0.5 in the optical semiconductor of the present invention are that such a composition is suitable for water photolysis, and in addition to this, that $InGaO_3(ZnO)_y$ and the composition in which a part of oxygen is substituted by nitrogen in the above compound are very stable. Since the optical semiconductor of the present invention is a solid solution containing ZnO, it is a relatively stable compound. Therefore, even if the compound has a high content of In, it does not undergo phase separation unlike $In_zGa_{1-z}N$. As a result, x>0.2 can be satisfied in the above general formula, resulting in a narrow band gap, which cannot be achieved in conventional $In_zGa_{1-z}N$. As described above, according to the present invention, a novel optical semiconductor exhibiting the effects resulting from the solid solution containing ZnO can be obtained.

In the optical semiconductor of the present invention, y is preferably 1 or more and 6 or less in the general formula.

In the case where the optical semiconductor of the present invention has this composition (in the case where it has a composition in which a part of O is substituted by N in the general formula: $In_{2x}Ga_{2(1-x)}O_3(ZnO)_y$, where x and y satisfy x=0.5 and 1≤y≤6), the optical semiconductor of the present invention is likely to form a single phase, and can have excellent optical semiconductor properties.

It is desirable that y be an integer in the above general formula because a single-phase optical semiconductor is more likely to be obtained. However, if the stoichiometry holds, the value of y is not limited to an integer. For example, if y is 3/2, the optical semiconductor of the present invention is represented by $In_2Ga_2O_6(ZnO)_3$.

In the optical semiconductor of the present invention, y is preferably 2 or 6.

In the case where the optical semiconductor of the present invention has this composition (in the case where it has a composition in which a part of O is substituted by N in the general formula: $In_{2x}Ga_{2(1-x)}O_3(ZnO)_y$, where x and y satisfy x=0.5 and y=2 or 6), this optical semiconductor can have a stable wurtzite crystal structure. Therefore, a part of the oxygen lattice of $In_{2x}Ga_{2(1-x)}O_3(ZnO)_y$ can easily be substituted by nitrogen. As a result, a single-phase optical semiconductor is more likely to be obtained.

The optical semiconductor of the present invention may have any composition in which a part of O is substituted by N in the general formula: $In_{2x}Ga_{2(1-x)}O_3(ZnO)_y$, where x and y satisfy 0.2<x<1 and 0.5≤y. Therefore, the amount of N that substitutes for O is not particularly limited. However, it is preferred that all the cations (In, Ga, and Zn) contained in the optical semiconductor have the same wurtzite crystal structure because they can form a stable solid solution. That is, it is preferred because the optical semiconductor has the wurtzitei crystal structure. For that purpose, Ga ions, In ions, and Zn ions are required to be GaN, InN, and ZnO, respectively. Therefore, it is preferable to substitute O by N until the crystal structure of the optical semiconductor is transformed into a wurtzite structure.

Second Embodiment

The optical semiconductor electrode of the present invention includes a conductive substrate and an optical semiconductor layer disposed on the conductive substrate. In the optical semiconductor layer, the junction plane near-field region of the optical semiconductor layer with the conductive substrate is composed of the composition A represented by a general formula: $In_{2x}Ga_{2(1-x)}O_3(ZnO)_y$, where x and y satisfy 0.2<x<1 and 0.5≤y. The surface near-field region of the optical semiconductor layer is composed of the composition B having a composition in which a part of O is substituted by N in the general formula. The Fermi level of the composition A is higher than the Fermi level of the composition B. The Fermi level of the composition A and the Fermi level of the composition B can be adjusted, for example, by controlling the number of lattice defects of oxygen and nitrogen by the synthesis temperature of materials or by doping Si.

In the optical semiconductor electrode of the present invention, the surface near-field region of the optical semiconductor layer is composed of the composition B. The composition B corresponds to the optical semiconductor of the present invention described in the first embodiment. Therefore, the optical semiconductor electrode of the present invention can utilize sunlight effectively and has optical semiconductor properties with high quantum efficiency. Furthermore, since the optical semiconductor layer that constitutes the optical semiconductor electrode of the present invention contains the composition A and the composition B and has the above-mentioned structure, it has improved charge separation capability. Therefore, the optical semiconductor electrode of the present invention has further improved quantum efficiency. This principle is described with reference to FIG. 1, FIG. 2 and FIG. 3. In the present embodiment, the case where the optical semiconductor layer is formed of a first layer disposed on the conductive substrate and containing the composition A; and a second layer disposed on the first layer and containing the composition B is described as an example. The first layer may consist essentially of the composition A. The second layer may consist essentially of the composition B. As stated herein, "the first layer consists essentially of the composition A" means not only that the first layer consists of the composition A but also that the first layer contains trace amounts of substances such as impurities, other than the composition A. Likewise, "the second layer consists essentially of the composition B" means not only that the second layer consists of the composition B but also that the second layer contains trace amounts of substances such as impurities, other than the composition B. Therefore, in this case, the first layer and the second layer may contain trace amounts of (for example, 1 atom % or less, preferably 0.001 atom % or less) other substances such as impurities.

FIG. 1 shows the energy levels of a conductive substrate 21, a first layer 22 composed of the composition A having a composition of $In_{2x}Ga_{2(1-x)}O_3(ZnO)_y$, and a second layer 23 composed of the composition B in which a part of oxygen in the composition A is substituted by nitrogen, relative to the vacuum level. The band edges $E_{C1}$ and $E_{C2}$ of the conduction bands of the first layer 22 and the second layer 23 are at almost the same level because they are formed by the hybrid orbital of the s and p orbitals of In, Ga and Zn cations. On the other hand, the band edge $E_{V1}$ of the valence band of the first layer 22 is formed by the p orbital of oxygen, and the band edge $E_{V2}$ of the valence band of the second layer 23 is formed by the hybrid of the p orbital of oxygen and the p orbital of nitrogen. Therefore, the energy level of $E_{V2}$ is higher than that of $E_{V1}$.

Figure 2:
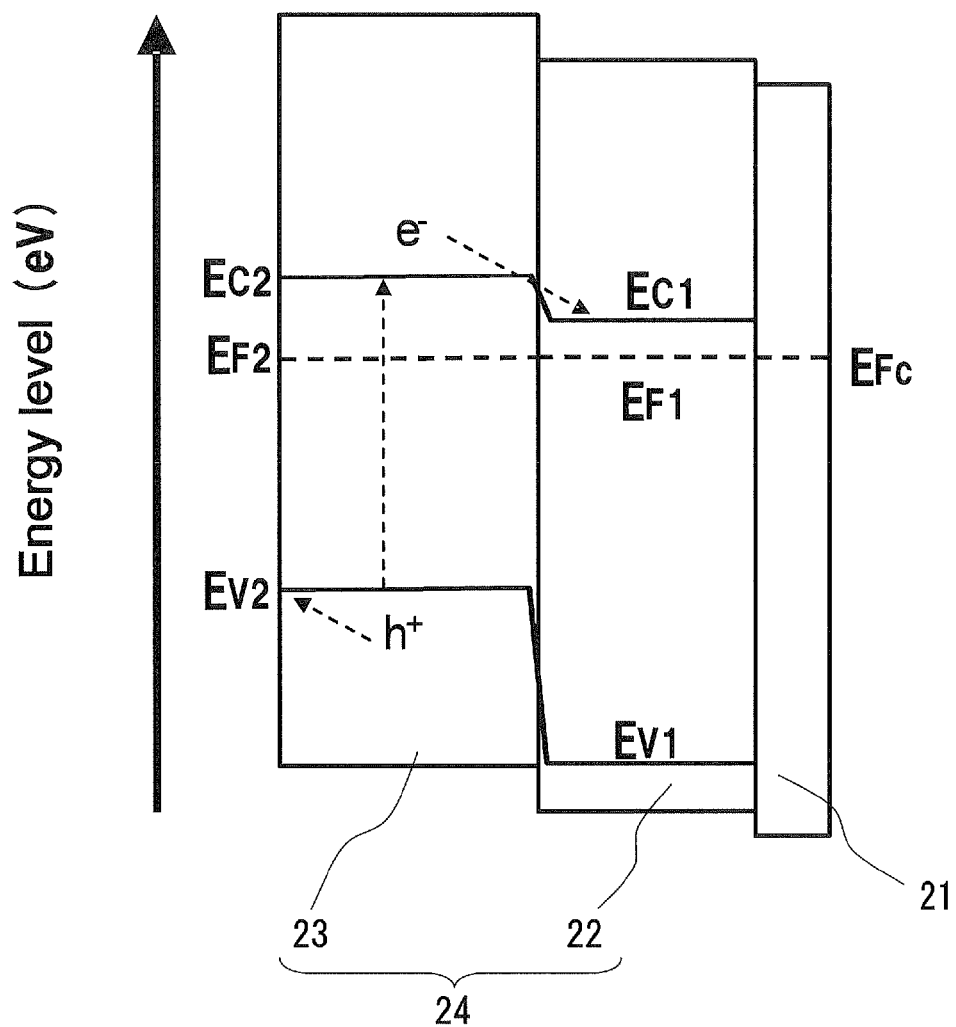
FIG. 2 is a conceptual diagram showing the band structures of the conductive substrate, the surface near-field region of the optical semiconductor layer, and the junction plane near-field region of the optical semiconductor layer with the conductive substrate, after being joined together, which constitute the optical semiconductor electrode according to the embodiment of the present invention.

Here, in the case where the Fermi level $E_{F1}$ of the first layer 22 (composition A) is higher than the Fermi level $E_{F2}$ of the second layer 23 (composition B), when the conductive substrate 21, the first layer 22, and the second layer 23 are joined together, the valence bands and the conduction bands shift so that the Fermi levels match each other. Thereby, the energy levels as shown in FIG. 2 are obtained, and the conductive substrate 21, the first layer 22, and the second layer 23 form an ohmic junction. As a result, when the second layer 23 is irradiated with sunlight, electrons are generated in the conduction band and holes are generated in the valence band, respectively, in the irradiated portion of the second layer 23. The holes generated at this time transfer toward the surface of the second layer 23 along the band edge of the valence band. On the other hand, the electrons transfer from the second layer 23 to the conductive substrate 21 through the first layer 22 along the band edge of the valence band. As a result, the electrons and holes generated by irradiation with light are separated from each other. Thus, an optical semiconductor layer 24 having high charge separation capability can be obtained.

Figure 3:
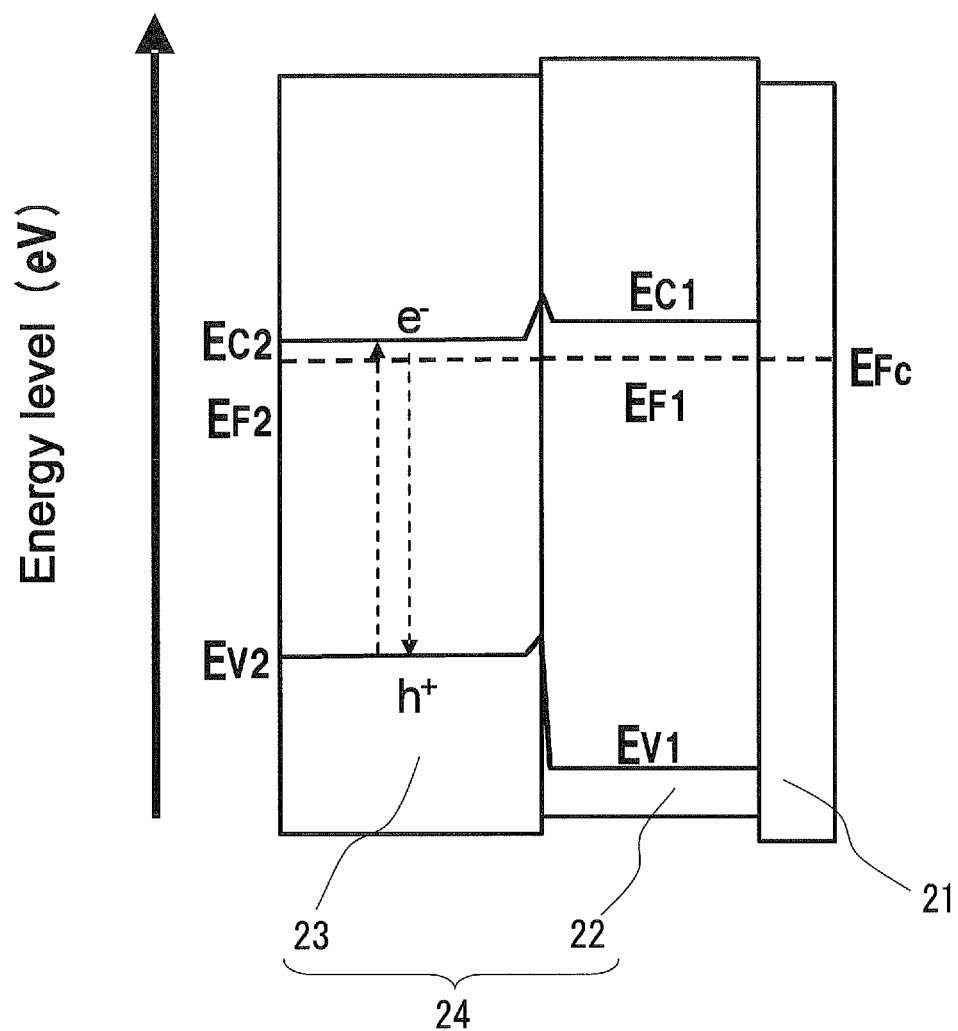
FIG. 3 is a conceptual diagram showing the band structures of a conductive substrate, a surface near-field region of an optical semiconductor layer, and a junction plane near-field region of the optical semiconductor layer with the conductive substrate, after being joined together, which constitute an optical semiconductor electrode according to a comparative embodiment.

On the other hand, as a comparative embodiment, the case where the Fermi level $E_{F1}$ of the first layer 22 is lower than the Fermi level $E_{F2}$ of the second layer 23 is discussed. In this case, when the conductive substrate 21, the first layer 22, and the second layer 23 are joined together, the valence bands and the conduction bands shift so that the Fermi levels match each other. Thereby, the energy levels as shown in FIG. 3 are obtained, and the conductive substrate 21, the first layer 22, and the second layer 23 form a Schottky junction. As a result, a square well potential is formed in the second layer 23. Therefore, when the second layer 23 is irradiated with sunlight, electrons are generated in the conduction band and holes are generated in the valence band, respectively, in the irradiated portion of the second layer 23, but the recombination of electrons and holes occurs. Thus, in the case where the Fermi level $E_{F1}$ of the first layer 22 is lower than the Fermi level $E_{F2}$ of the second layer 23, the charge separation capability of the optical semiconductor layer 24 decreases.

In the present embodiment, the optical semiconductor 24 has a two-layer structure in which the second layer 23 composed of the composition B is disposed on the first layer 22 composed of the composition A. This optical semiconductor layer 24 can be produced, for example, by sputter deposition in an oxygen atmosphere, using an $In_{2x}Ga_{2(1-x)}O_3(ZnO)_y$ target, followed by sputter deposition in a nitrogen atmosphere.

The structure of the optical semiconductor layer that constitutes the optical semiconductor electrode of the present invention is not limited to the two-layer structure. The optical semiconductor layer may be produced by a method in which $In_{2x}Ga_{2(1-x)}O_3(ZnO)_y$ is used as a sputtering target and the sputtering atmosphere is gradually changed from an oxygen atmosphere at the start of deposition to a nitrogen atmosphere (the nitrogen concentration in the atmosphere is increased). The optical semiconductor layer produced by this method has a layered structure with a gradient composition from the composition A to the composition B. As stated herein, the layered structure with a gradient composition from the composition A to the composition B means the structure that satisfies the following conditions (1) and (2):

(1) The junction plane near-field region in the optical semiconductor layer is the composition A, and the surface near-field region in the optical semiconductor layer is the composition B; and (2) in the optical semiconductor layer, the concentration of nitrogen element increases from the junction plane near-field region to the surface near-field region along the thickness direction of the optical semiconductor layer.

The optical semiconductor layer having such a layered structure with a gradient composition is preferred because its charge separation capability is higher than that of a two-layer structure.

For the conductive substrate that constitutes the optical semiconductor electrode of the present invention, electrically conductive materials, such as ITO (Indium Tin Oxide) and FTO (Fluorine doped Tin Oxide), or metals such as Ti, Ni, Ta, Al, Cu and Ag, can be used, for example. A substrate having a layer of an oxide of In, Ga and Zn also can be used. Specifically, a substrate having a layer of a composition represented by $In_{2x}Ga_{2(1-x)}O_3(ZnO)_y$, where x and y satisfy $0.2<x<1$ and $0.5\leq y$, can be used. Such a substrate is useful because it has functions of both the conductive substrate and the composition B and further its structure is simple.

Third Embodiment

A photoelectrochemical cell according to an embodiment of the present invention is described.

The photoelectrochemical cell of the present embodiment includes an optical semiconductor electrode, a counter electrode, a water-containing electrolyte, and a container containing these. The optical semiconductor electrode includes a conductive substrate and an optical semiconductor layer disposed on the conductive substrate and containing the optical semiconductor of the present invention as described in the first embodiment. The counter electrode is connected electrically to the conductive substrate of the optical semiconductor electrode. The electrolyte is in contact with the surfaces of the optical semiconductor layer and the counter electrode. The photoelectrochemical cell generates hydrogen when the optical semiconductor layer is irradiated with light.

Figure 4:
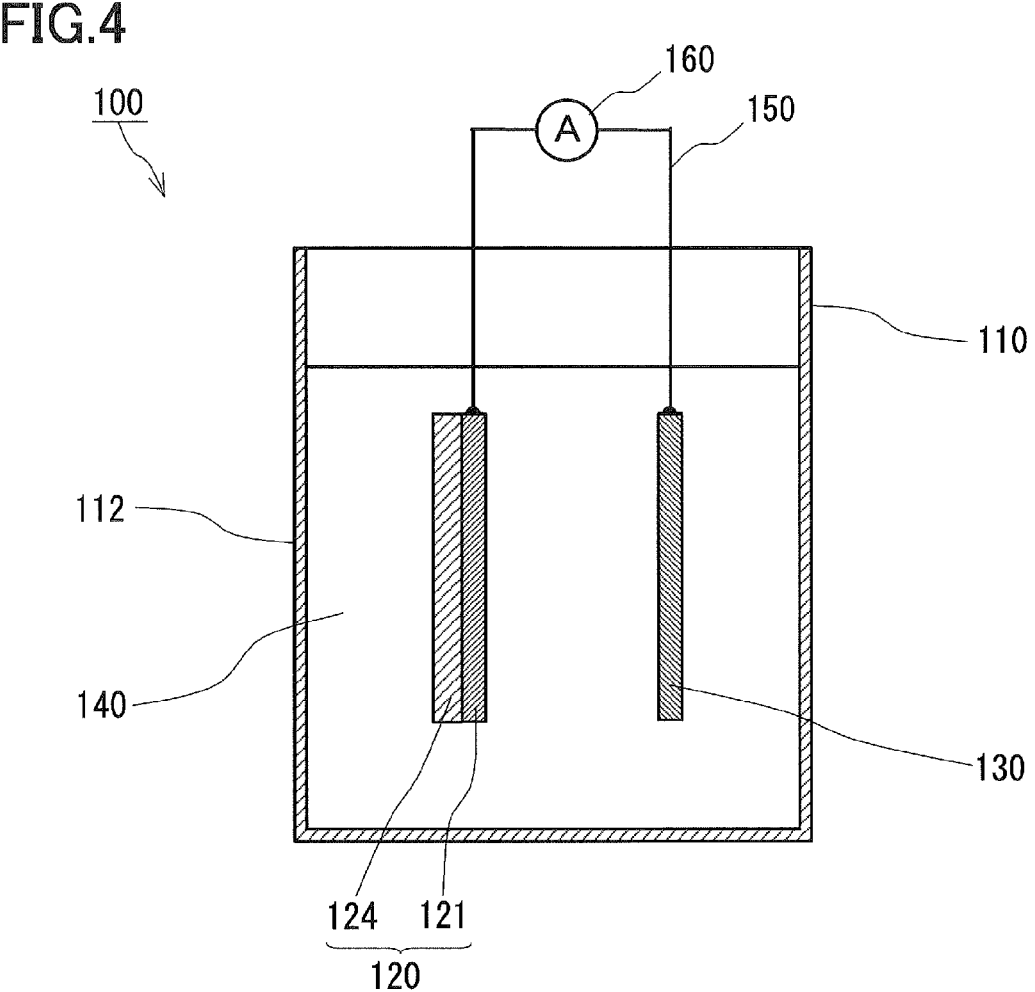
FIG. 4 is a schematic view showing the configuration of a photoelectrochemical cell according to an embodiment of the present invention.

Since this configuration causes charge separation to occur in the photoexcited optical semiconductor, the quantum efficiency can be increased. In addition, since electrons and holes generated by the charge separation transfer separately to the counter electrode and the optical semiconductor electrode, respectively, hydrogen and oxygen can be generated on the surfaces of the electrodes that differ from each other. That is, hydrogen and oxygen can be generated separately. The photoelectrochemical cell of the present invention is described with reference to FIG. 4. As shown in FIG. 4, a photoelectrochemical cell 100 of the present embodiment includes an optical semiconductor electrode 120, a counter electrode 130 paired with the optical semiconductor electrode 120, an electrolyte 140 containing water, and an open container 110 containing the optical semiconductor 120, the counter electrode 130, and the electrolyte 140.

The optical semiconductor electrode 120 and the counter electrode 130 are disposed inside the container 110 so that the surfaces thereof are in contact with the electrolyte 140. The optical semiconductor electrode 120 includes a conductive substrate 121 and an optical semiconductor layer 124 disposed on the conductive substrate 121. A portion of the container 110 facing the optical semiconductor layer 124 of the optical semiconductor electrode 120 that is disposed inside the container 110 (which is, hereinafter, abbreviated as a light incident portion 112) is made of a material that transmits light such as sunlight.

Figure 5:
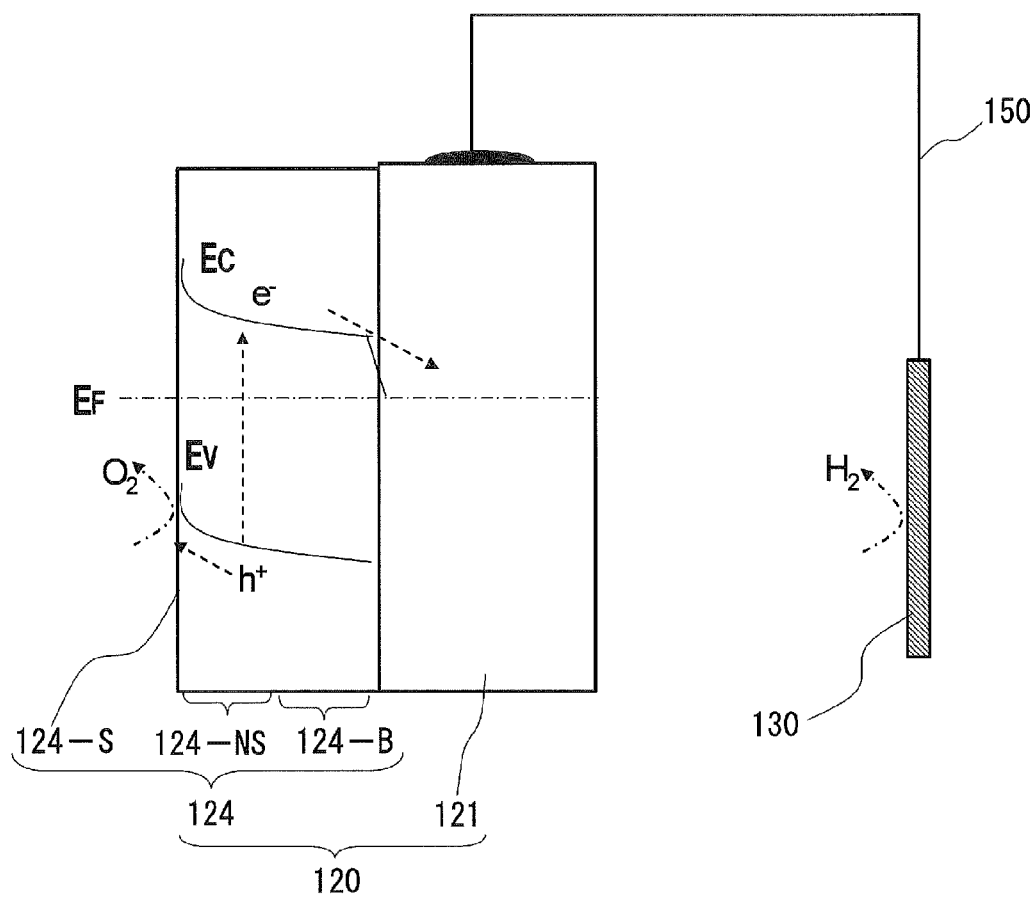
FIG. 5 is a schematic view showing the operation of a photoelectrochemical cell according to an embodiment of the present invention.

The conductive substrate 121 of the optical semiconductor electrode 120 is connected electrically to the counter electrode 130 by a conducting wire 150. As stated herein, the counter electrode means an electrode that can exchange electrons with an optical semiconductor electrode without an electrolyte. Accordingly, in the present embodiment, there is no particular limitation on the positional relationship and the like of the counter electrode 130 with the optical semiconductor electrode 120, as long as the counter electrode 130 is connected electrically to the conductive substrate 121 that constitutes the optical semiconductor electrode 120. In the present embodiment, the optical semiconductor layer 124 is formed of an n-type semiconductor. Therefore, the counter electrode 130 serves as an electrode that receives electrons from the optical semiconductor electrode 120 without the electrolyte. Next, the operation of the photoelectrochemical cell 100 of the present embodiment is described with reference to FIG. 5.

The optical semiconductor layer 124 of the optical semiconductor electrode 120 disposed inside the container 110 is irradiated with sunlight through the light incident portion 112 of the container 110 in the photoelectrochemical cell 100. Thereby, electrons are generated in the conduction band and holes are generated in the valence band in the irradiated portion of the optical semiconductor layer 124 (which is the surface near—field region 124—NS of the optical semiconductor layer 124 in the present embodiment). Since the optical semiconductor of the present invention is an n-type semiconductor, the potential of the surface 124-S of the optical semiconductor layer 124 is higher than the potential of the inner portion 124-B of the optical semiconductor layer 124. Therefore, the holes generated at this time transfer toward the surface 124-S of the optical semiconductor layer 124 along the band edge Ev of the valence band. Thus, water is decomposed on the surface 124-S of the optical semiconductor layer 124 according to the following reaction formula (1), so that oxygen is generated. On the other hand, the electrons transfer from the surface near—field region 124-NS of the optical semiconductor layer 124 to the conductive substrate 121 through the inner portion 124-B of the optical semiconductor layer along the band edge $E_C$ of the conduction band. The electrons that have transferred to the conductive substrate 121 transfer toward the side of the counter electrode 130 that is connected electrically to the conductive substrate 121, through the conducting wire 150. Thus, hydrogen is generated on the surface of the counter electrode 130 according to the following reaction formula (2).

$$4h^+ + 2H_2O \rightarrow O_2\uparrow + 4H^+ \quad (1)$$

$$4e^- + 4H^+ \rightarrow 2H_2\uparrow \quad (2)$$

Since the optical semiconductor of the present invention has excellent semiconductor characteristics, the optical semiconductor layer 124 has a low probability of recombination of holes and electrons. Furthermore, in the photoelectrochemical cell including the optical semiconductor electrode and the counter electrode as in the present invention, the holes and electrons are charge-separated and transfer separately to the optical semiconductor electrode and the counter electrode. This not only increases the quantum efficiency of the hydrogen evolution reaction by irradiation with light but also makes it possible to generate hydrogen and oxygen separately (to generate them on the surfaces of different electrodes).

It is preferred that the portion of the conductive substrate 121 that is not covered with the optical semiconductor layer 124 be covered, for example, with an insulating material such as a resin. With this covering, the portion of the conductive substrate 121 that is not covered with the optical semiconductor layer 124 can be prevented from dissolving in the electrolyte 140.

A material with a low overvoltage is used preferably for the counter electrode 130. For example, it is preferable to use a metal catalyst such as Pt, Au, Ag, Fe, or Ni for the counter electrode 130 because the activity of the counter electrode 130 is increased. Any electrolyte containing water can be used for the electrolyte 140. The electrolyte containing water may be acidic or alkaline. In the case where a solid electrolyte is disposed between the optical semiconductor electrode 120 and the counter electrode 130, the electrolyte 140 in contact with the surface of the optical semiconductor layer 124 of the optical semiconductor electrode 120 and the surface of the counter electrode 130 can be replaced by pure water for electrolysis.

The optical semiconductor electrode in the photoelectrochemical cell of the present embodiment may be replaced by the optical semiconductor electrode of the present invention as described in the second embodiment. With such a configuration, the same effects as those of the photoelectrochemical cell of the present embodiment can be obtained and higher charge separation capability also can be achieved.

Fourth Embodiment

The energy system according to an embodiment of the present invention is described.

Figure 6:
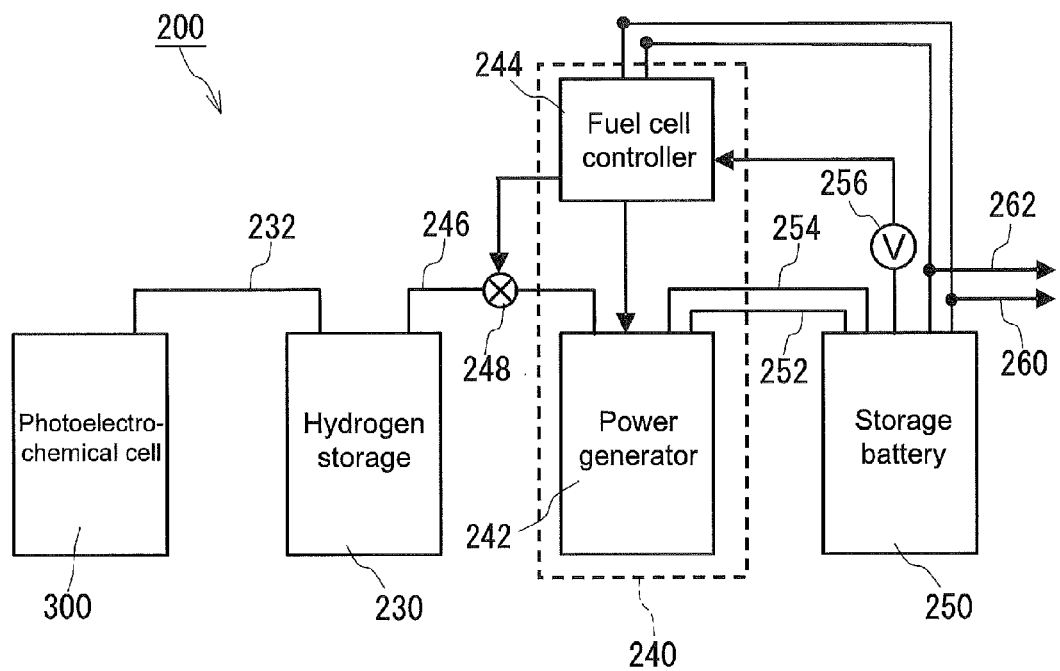
FIG. 6 is a schematic view showing the configuration of an energy system according to an embodiment of the present invention.

The energy system of the present embodiment includes: the photoelectrochemical cell of the present invention as described in the third embodiment; a hydrogen storage, connected to the photoelectrochemical cell by a first pipe, for storing hydrogen generated in the photoelectrochemical cell; and a fuel cell, connected to the hydrogen storage by a second pipe, for converting hydrogen stored in the hydrogen storage into electricity. With this configuration, a highly efficient system, from which electricity can be drawn when necessary, can be created. The energy system of the present embodiment may further include a storage battery for storing electricity converted by the fuel cell. Next, the operation of an energy system 200 of the present embodiment is described with reference to FIG. 6 and FIG. 7.

The energy system 200 of the present embodiment includes a photoelectrochemical cell 300, a hydrogen storage 230, a fuel cell 240, and a storage battery 250.

Figure 7:
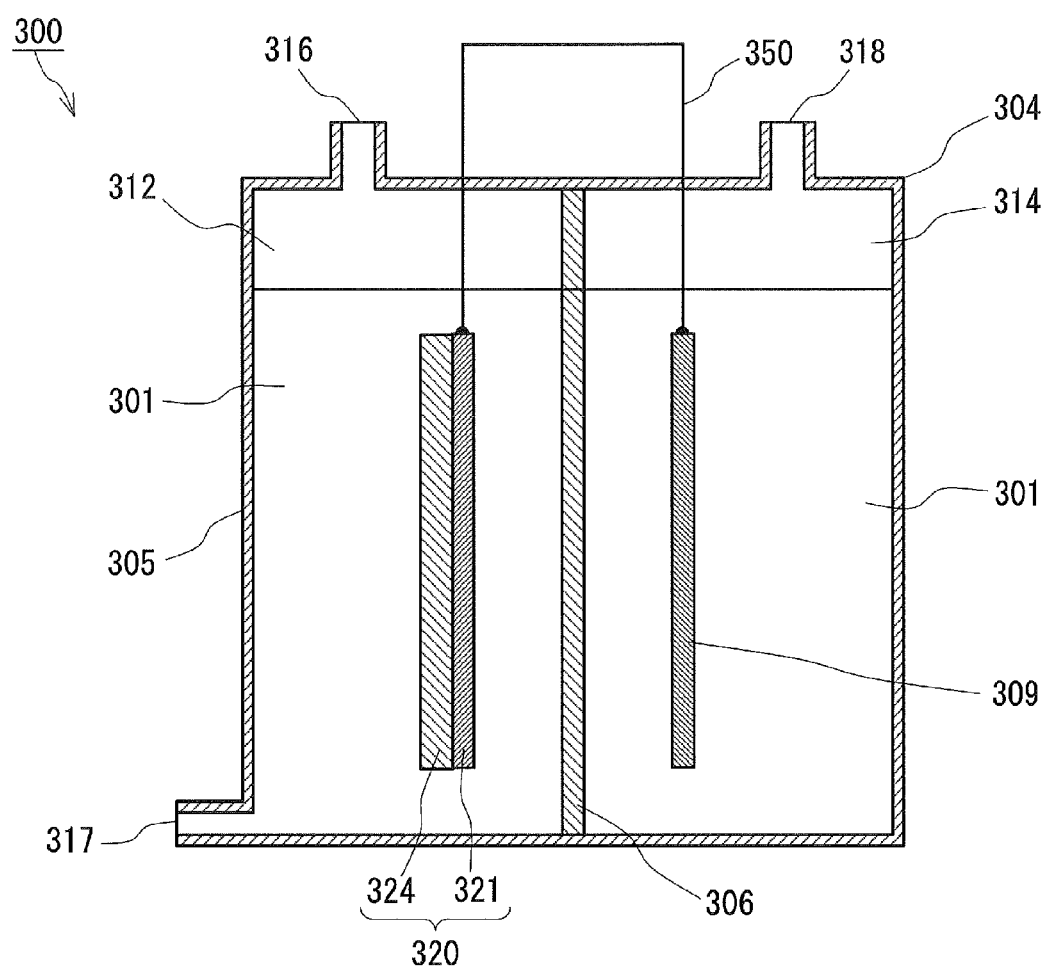
FIG. 7 is a schematic cross-sectional view showing the configuration of a photoelectrochemical cell in the energy system shown in FIG. 6.

As shown in FIG. 7, the photoelectrochemical cell 300 includes a housing (container) 304, a separator 306, an optical semiconductor electrode 320, and a counter electrode 309. The separator 306 separates the inside of the housing 304 into two chambers: a first chamber 312 and a second chamber 314. A water-containing electrolyte 301 is contained in each of the first chamber 312 and the second chamber 314.

The optical semiconductor electrode 320 is disposed at a position in contact with the electrolyte 301 inside the first chamber 312. The optical semiconductor electrode 320 includes a conductive substrate 321 and an optical semiconductor layer 324 disposed on the conductive substrate 321. The first chamber 312 is provided with a first gas outlet 316 for discharging oxygen generated inside the first chamber 312 and a water inlet 317 for supplying water into the first chamber 312. A portion of the housing 304 that faces the optical semiconductor layer 324 of the optical semiconductor electrode 320 disposed inside the first chamber 312 (hereinafter, abbreviated as a light incident portion 305) is made of a material that transmits light such as sunlight.

On the other hand, the counter electrode 309 is disposed at a position in contact with the electrolyte 301 inside the second chamber 314. The second chamber 314 is provided with a second gas outlet 318 for discharging hydrogen generated inside the second chamber 314.

The conductive substrate 321 of the optical semiconductor electrode 320 is connected electrically to the counter electrode 309 by a conducting wire 350.

The optical semiconductor electrode 320 and the conductive substrate 321 in the present embodiment respectively have the same configurations as the optical semiconductor electrode 120 and the conductive substrate 121 described in the third embodiment.

The separator 306 is formed of a material that allows the electrolyte 301 to pass through and has a function of blocking gas generated inside each of the first chamber 312 and the second chamber 314. Examples of the material of the separator 306 include a solid electrolyte such as a polymeric solid electrolyte. As the polymeric solid electrolyte, an ion exchange membrane such as Nafion (registered trademark) can be mentioned, for example. After the internal space of the container is separated into two regions using such a separator, the electrolyte and the surface of the optical semiconductor electrode (optical semiconductor layer) are made in contact in one of the regions while the electrolyte and the surface of the counter electrode are made in contact in the other region. With such a configuration, oxygen and hydrogen generated inside the container can be separated easily.

In the present embodiment, the photoelectrochemical cell 300 having the configuration shown in FIG. 7 is used. However, the photoelectrochemical cell used in the energy system 200 of the present embodiment is not limited to this. Any photoelectrochemical cell of the present invention can be used, and for example, the photoelectrochemical cell 100 shown in FIG. 4 also can be used.

The hydrogen storage 230 is connected to the second chamber 314 of the photoelectrochemical cell 300 by a first pipe 232. The hydrogen storage 230 can be composed, for example, of a compressor for compressing the hydrogen generated in the photoelectrochemical cell 300 and a high-pressure hydrogen tank for storing the hydrogen compressed by the compressor.

The fuel cell 240 includes a power generator 242 and a fuel cell controller 244 for controlling the power generator 242. The fuel cell 240 is connected to the hydrogen storage 230 by a second pipe 246. The second pipe 246 is provided with a block valve 248. For example, a solid polymer electrolyte fuel cell can be used as the fuel cell 240.

The positive electrode and the negative electrode of the storage battery 250 respectively are connected electrically to the positive electrode and the negative electrode of the power generator 242 in the fuel cell 240 by a first line 252 and a second line 254. The storage battery 250 is provided with a capacity meter 256 for measuring the remaining capacity of the storage battery 250. For example, a lithium ion battery can be used as the storage battery 250.

Next, the operation of the energy system 200 of the present embodiment is described.

When the surface of the optical semiconductor layer 324 of the optical semiconductor electrode 320 disposed inside the first chamber 312 is irradiated with sunlight through the light incident portion 305 of the photoelectrochemical cell 300, electrons and holes are generated inside the optical semiconductor layer 324. The holes generated at this time transfer to the surface near-field region along the band edge of the valence band of the optical semiconductor layer 324. Thus, water is decomposed on the surface of the optical semiconductor layer 324 according to the above reaction formula (1), so that oxygen is generated.

On the other hand, the electrons transfer to the conductive substrate 321 from the junction plane near-field region of the optical semiconductor layer 324 with the conductive substrate 321 along the band edge of the conduction band caused by the junction between the conductive substrate 321 and the optical semiconductor layer 324. The electrons that have transferred to the conductive substrate 321 transfer toward the side of the counter electrode 309 that is connected electrically to the conductive substrate 321 through the conducting wire 350. Thus, hydrogen is generated on the surface of the counter electrode 309 according to the above reaction formula (2).

Oxygen generated inside the first chamber 312 is discharged from the first gas outlet 316 to the outside of the photoelectrochemical cell 300. On the other hand, hydrogen generated inside the second chamber 314 is supplied into the hydrogen storage 230 through the second gas outlet 318 and the first pipe 232.

In generating power in the fuel cell 240, the block valve 248 is opened according to signals from the fuel cell controller 244, so that the hydrogen stored inside the hydrogen storage 230 is supplied to the power generator 242 of the fuel cell 240 through the second pipe 246.

The electricity generated in the power generator 242 of the fuel cell 240 is stored inside the storage battery 250 through the first line 252 and the second line 254. The electricity stored inside the storage battery 250 is supplied to homes, businesses, and the like through a third line 260 and a fourth line 262.

According to the photoelectrochemical cell 300 in the present embodiment, it is possible to improve the quantum efficiency of the hydrogen evolution reaction by irradiation with light. Thus, the energy system 200 of the present embodiment provided with this photoelectrochemical cell 300 can supply electric power efficiently.

EXAMPLES

Example 1

Nitridation of $InGaO_3(ZnO)_y$ (Nitridation Method)

An oxide represented by $In_{2x}Ga_{2(1-x)}O_3(ZnO)_y$, where x=0.5 is satisfied, was nitrided. 2 g of each of powders, $In_2Ga_2ZnO_7$ (y=1/2), $InGaZnO_4$ (y=1), $InGaZn_2O_5$ (y=2), $InGaZn_6O_9$ (y=6), and $InGaZn_7O_{10}$ (y=7), was put into an alumina boat. This was placed in the center of a quartz tube with an inner diameter of 50 mm and a length of 1000 mm. Then, a portion of the quartz tube with a length of 150 mm each from the center thereof was heated at 650° C. for 4 hours in a tube furnace, with ammonia flowing in the quartz tube at 1 L/min.

(XRD Structural Analysis)

The peaks of $In_2Ga_2ZnO_7$ (y=1/2), $InGaZnO_4$ (y=1), $InGaZn_2O_5$ (y=2), and $InGaZn_6O_9$ (y=6) slightly shifted toward the high-angle side after the nitridation. However, no change was observed in the peaks before and after the nitridation. In contrast, in $InGaZn_7O_{10}$ (y=7), the peak of $InGaZn_6O_9$ (y=6) was observed.

(Change in Weight)

In $In_2Ga_2ZnO_7$ (y=1/2), about 10% decrease in weight was observed. Furthermore, something like a metal attached to the wall of the quartz tube on the ammonia outlet side was observed. As for the other samples, very little change in weight was observed.

(UV-Vis Diffuse Reflectance Spectra)

Figure 8A:
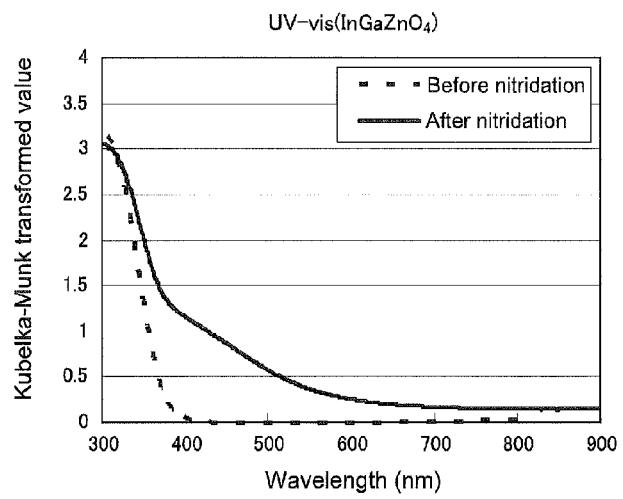
FIGS. 8A to 8C are diagrams showing the UV-vis diffuse reflectance spectra of optical semiconductors in Example 1 of the present invention.
Figure 8B:
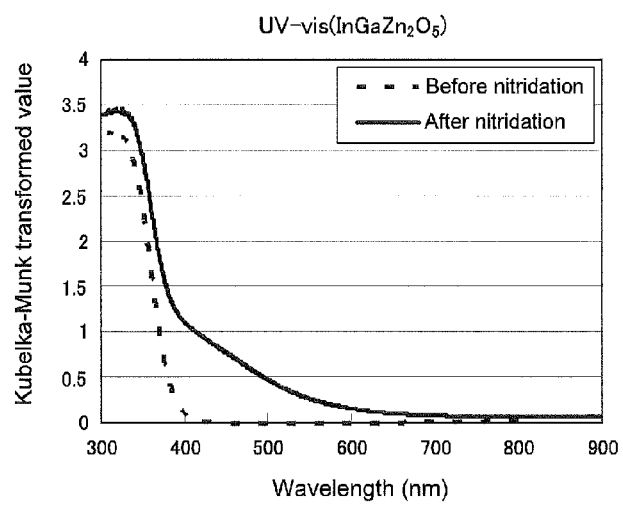
Figure 8C:
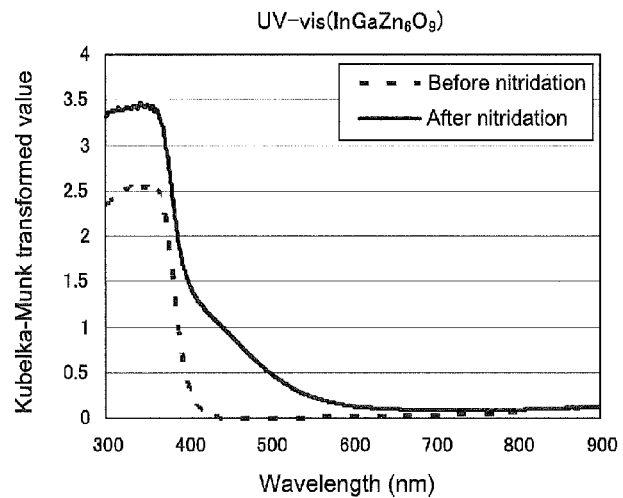

FIG. 8A to FIG. 8C show the UV-vis diffuse reflectance spectra of $InGaZnO_4$ (y=1), $InGaZn_2O_5$ (y=2), and $InGaZn_6O_9$ (y=6), respectively, before and after the nitridation. It is found from FIG. 8A to FIG. 8C that a new absorption appears in the range of 400 to 700 nm. However, since the absorption edge is observed around 400 nm, a part of the oxide seems to remain unnitrided.

(Discussion)

When y is 1 or more and 6 or less, nitridation of $InGaO_3(ZnO)_y$ was effective in view of stability. Moreover, the nitridation converted the $InGaO_3(ZnO)_y$ samples into compositions each having an absorption in the visible light region. In these compositions, no new peak appeared, although the peaks shifted from those before the nitridation in the XRD analysis. In view of this, it is considered that the substitution by nitrogen occurred at a doping level in these compositions.

Example 2

Change in $InGaO_3(ZnO)_y$ with Nitridation Temperature

A change with nitridation temperature in an oxide $In_{2x}Ga_{2(1-x)}O_3(ZnO)_y$, where x=0.5 and y=2 are satisfied, was observed. First, 2 g of $InGaZn_2O_5$ powder was put into an alumina boat. This was placed in the center of a quartz tube with an inner diameter of 50 mm and a length of 1000 mm. Then, a portion of the quartz tube with a length of 150 mm each from the center thereof was heated at 650° C., 700° C., 750° C., and 800° C., each for 8 hours in a tube furnace, with ammonia flowing in the quartz tube at 1 L/min.

(Change in Weight)

When the nitridation temperature was 650 to 750° C., very little weight change was observed before and after the nitridation. However, when the nitridation temperature was 800° C., about 50% decrease in the weight was observed due to the nitridation. Furthermore, something like a metal attached to the wall of the quartz tube on the ammonia outlet side was also observed.

(XRD Structural Analysis)

Figure 9:
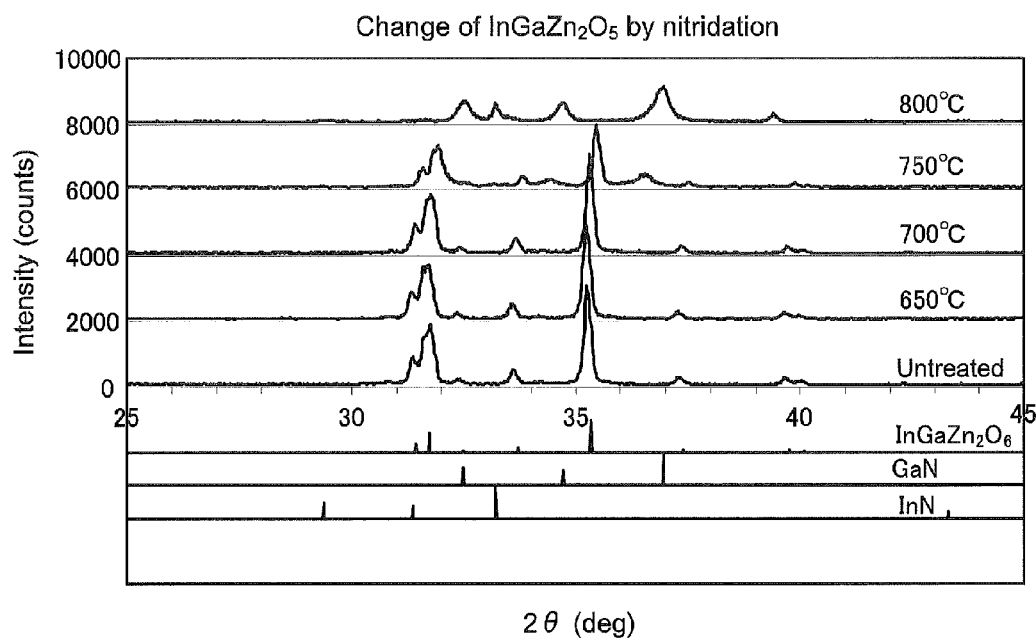
FIG. 9 is a diagram showing the XRD chart of an optical semiconductor in Example 2 of the present invention.

FIG. 9 shows the results of the XRD structural analysis before and after the nitridation. The upper part shows the data of the obtained compositions. The lower part shows the database of the materials. When the nitridation temperature was 650 to 700° C., no peak change was observed before and after the nitridation, although the peaks slightly shifted toward the high-angle side after the nitridation. In contrast, when the nitridation temperature was 750° C., the peaks significantly shifted toward the high-angle side and a new peak also appeared. When the nitridation temperature was 800° C., the peaks obtained at 650 to 750° C. disappeared and the peaks of GaN and InN appeared.

(XPS Elemental Analysis)

Figure 10:
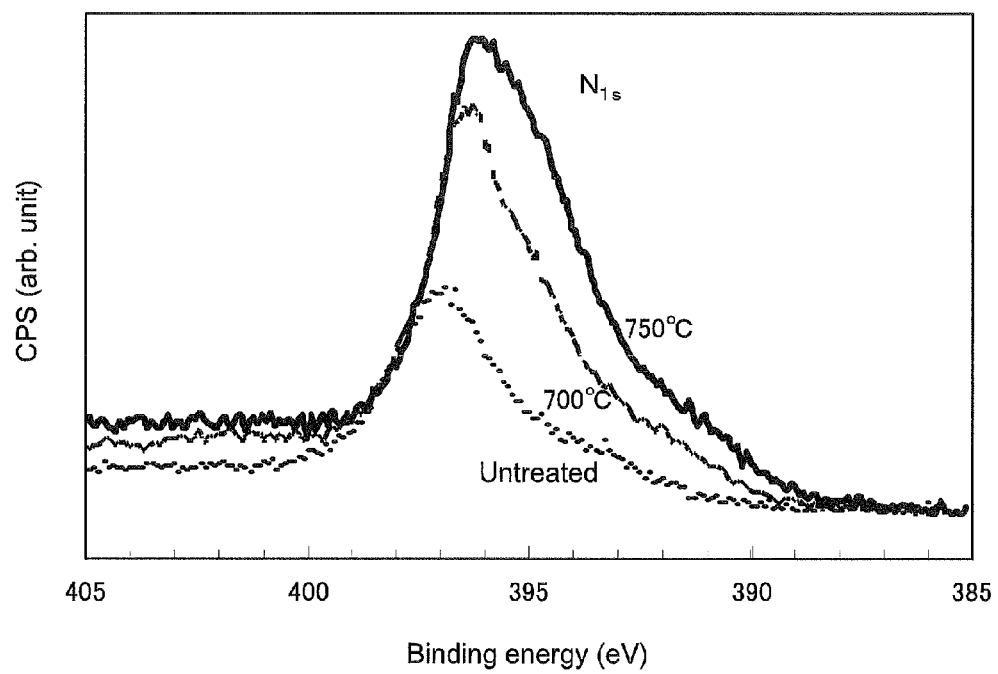
FIG. 10 is a diagram showing the XPS spectra (N1s) of Example 2 of the present invention.
Figure 11A:
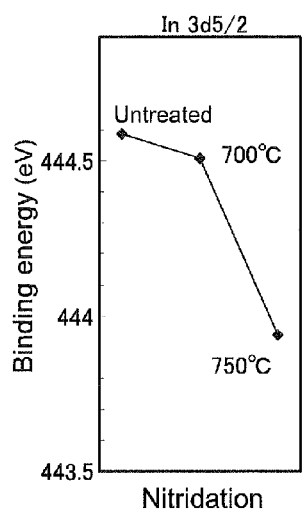
FIGS. 11A to 11C are diagrams showing the XPS spectra of Example 2 of the present invention.
Figure 11B:
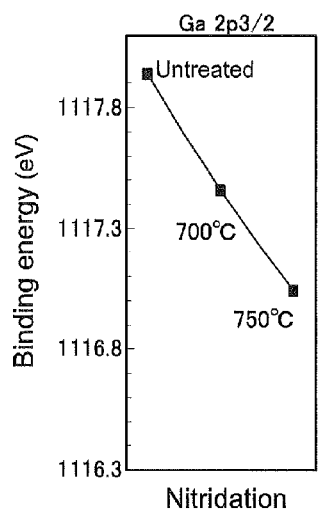
Figure 11C:
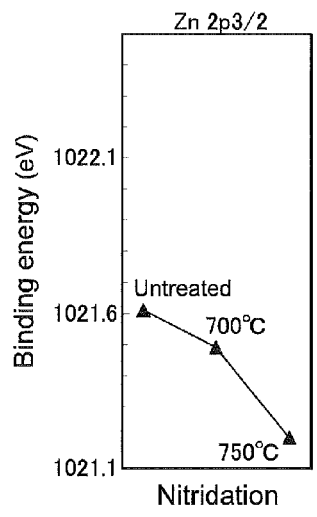

FIG. 10 shows a change in the peak of a nitrogen atom N1s before and after the nitridation. Peaks were detected around 393 eV and 397 eV even before the treatment. However, these peaks are presumably derived from nitrogen adsorbed on $InGaZn_2O_5$. In addition to these peaks, a new peak appeared around 395 eV at a nitridation temperature of 700 to 750° C. This is presumably derived from nitrogen atoms substituted from oxygen atoms of $InGaZn_2O_5$ by nitridation. FIG. 11A to FIG. 11C show the chemical shifts of the In 3d5/2 peak, Ga 2p3/2 peak, and Zn 2p3/2 peak of metal atoms of In, Ga, and Zn, respectively, before and after the nitridation. Before the treatment, the peaks were located in the oxide region. However, it is found that oxygen around the metal element was substituted by nitrogen by nitridation, which shifted the peaks toward the low binding energy side. In particular, the In and Ga peaks significantly shifted probably because the nearest neighboring oxygen was substituted.

(UV-Vis Diffuse Reflectance Spectra)

Figure 12:
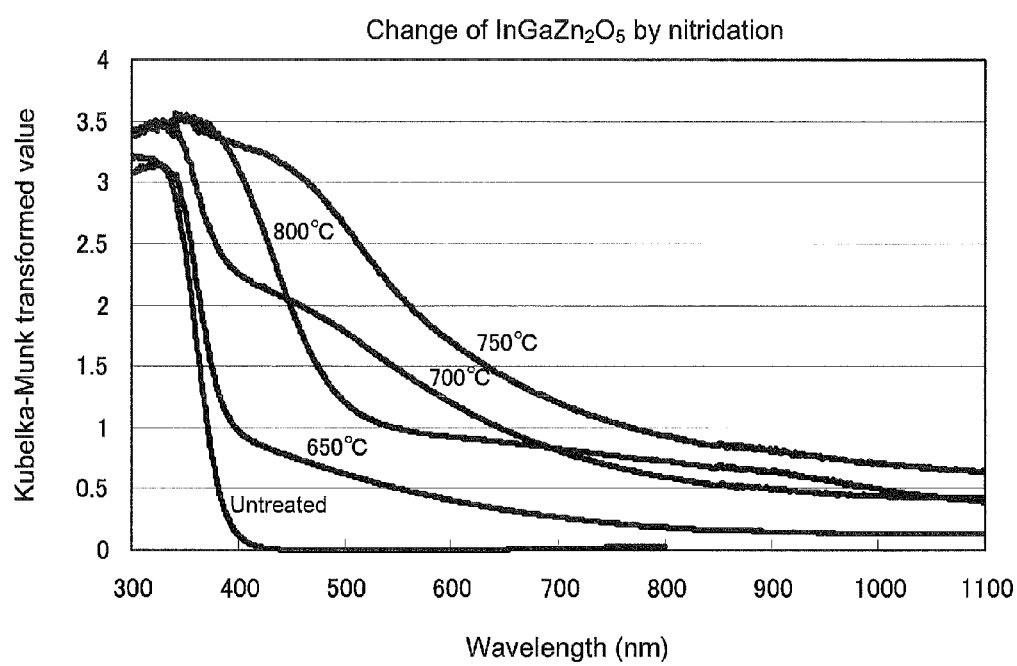
FIG. 12 is a diagram showing the UV-vis diffuse reflectance spectra of the optical semiconductor in Example 2 of the present invention.

FIG. 12 shows the results of the UV-vis diffuse reflectance spectra observed before and after nitridation. It is found that a new absorption appeared in the region of 400 to 700 nm when the nitridation temperature was 650 to 700° C. However, an absorption edge is observed around 400 nm, which probably means that a part of the oxide remained unnitrided. In contrast, when the nitridation temperature was 750° C., a still another absorption appeared in the region of 400 to 900 nm, and further no absorption edge of the oxide was observed. In view of this, it is considered that the oxide was completely substituted by nitrogen at a nitridation temperature of 750° C. When the nitridation temperature was 800° C., the absorption was blue-shifted and appeared in the region of 400 to 500 nm.

(Discussion)

For $InGaZn_2O_5$ (y=2), when the nitridation temperature was 650 to 700° C., only a peak shift was observed in the XRD analysis and no new peak appeared. Furthermore, since nitrogen was detected in the XPS elemental analysis, it is considered that the substitution by nitrogen occurred at a doping level. However, when the nitridation temperature was 750° C., the peaks shifted toward the high-angle side and a new peak also appeared in the XRD analysis. Moreover, a new nitrogen species (395 eV) was detected in the XPS elemental analysis, the peaks of the metal atoms shifted from the peak positions in the oxide region toward the lower binding energy side, and no absorption edge of the oxide was observed. From these results, it is considered that the oxide was nitrided into an oxynitride $(InGaN_2(ZnO)_2)$. When the nitridation temperature was 800° C., the GaN and InN peaks appeared and the absorption was blue-shifted in the XRD analysis. From these results, it is presumed that $InGaZn_2O_5$ (y=2) was phase-separated and Zn was sublimed, so that a mixture of GaN and InN was obtained. Therefore, it was confirmed that it is desirable to nitride an oxide represented by $In_{2x}Ga_{2(1-x)}O_3(ZnO)_y$, where x=0.5 and y=2 are satisfied, at 650 to 750° C., more desirably at 750° C., to nitride the oxide so as to synthesize the composition of the present invention.

A similar behavior was observed also in $InGaZn_6O_9$ (y=6).

On the other hand, $InGaZnO_4$ (y=1) exhibited the same behavior in the nitridation temperature range of 650 to 750° C. When the nitridation temperature was 750° C. or higher, decomposition was observed and a behavior in which the oxide was completely converted into an oxynitride $(InGaN_2(ZnO))$ was not observed.

Figure 13:
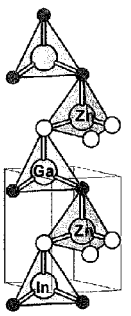
FIG. 13 is a diagram showing the crystal structures and the first-principles calculation results of optical semiconductors obtained by substituting a part of oxygen in $InGaZn_2O_5$ and $InGaZn_6O_8$, respectively, by nitrogen.
Figure 13:
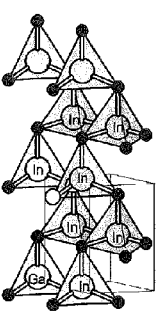
Figure 13:
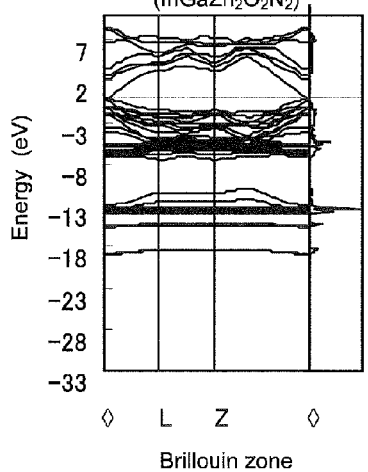
Figure 13:
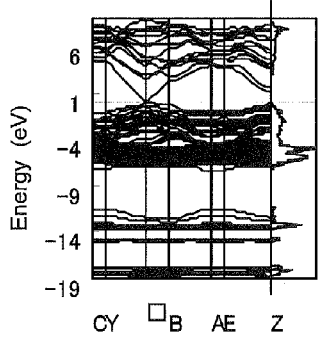

This phenomenon is described. In the case where $InGaO_3(ZnO)_y$ is converted into an oxynitride, if all the component cations In, Ga and Zn ions have a wurtzite crystal structure, they can form a solid solution and the solid solution is stabilized. For that purpose, Ga ions, In ions, and Zn ions are required to be GaN, InN, and ZnO, respectively. That is, it is presumed that $InGaN_2(ZnO)_y$ has a stable structure. This is suggested by the results of the XPS elemental analysis shown in FIG. 11A to FIG. 11C, in which significant shifts are observed in In and Ga while a smaller shift is observed in Zn after the nitridation. In terms of a crystal structure, oxygen ions and nitrogen ions have symmetries such as a symmetrical arrangement in a crystal, which reveals that $InGaZn_2O_5$ (y=2) and $InGaZn_6O_9$ (y=6), among those with y=1 to 6, can have a simple crystal structure, that is, a stable wurtzite crystal structure, as shown in FIG. 13. This result seems to be consistent with the fact that $InGaZn_2O_5$ (y=2) and $InGaZn_6O_9$ (y=6) can be converted into an oxynitride but $InGaZnO_4$ (y=1) cannot.

The band gaps of the structures shown in FIG. 13 were calculated by the first-principles calculation. FIG. 13 also shows these results. The structures shown in FIG. 13 are found to be stable structures because their band gaps can be calculated, although they are very different from the actual measured values obtained from the UV-vis diffuse reflectance spectra.

Example 3

Change in $In_{2x}Ga_{2(1-x)}O_3(ZnO)_2$ with Nitridation Temperature (Nitridation Method)

A change with nitridation temperature in an oxide $In_{2x}Ga_{2(1-x)}O_3(ZnO)_y$, where x=3/4 and y=2 are satisfied, was observed. 2 g of $In_3GaZn_4O_{10}$ powder was put into an alumina boat. This was placed in the center of a quartz tube with an inner diameter of 50 mm and a length of 1000 mm. Then, a portion of the quartz tube with a length of 150 mm each from the center thereof was heated at 650° C., 670° C., and 720° C., each for 4 hours in a tube furnace, with ammonia flowing in the quartz tube at 1 L/min.

(Change in Weight)

When the nitridation temperature was 650° C., very little weight change was observed. However, when the nitridation temperature was 670° C., about 5% decrease in the weight was observed. When the nitridation temperature was 720° C., about 18% decrease in the weight was observed. Furthermore, when the nitridation temperature was 720° C., something like a metal attached to the wall of the quartz tube on the ammonia outlet side was observed.

(XRD Structural Analysis)

Figure 14:
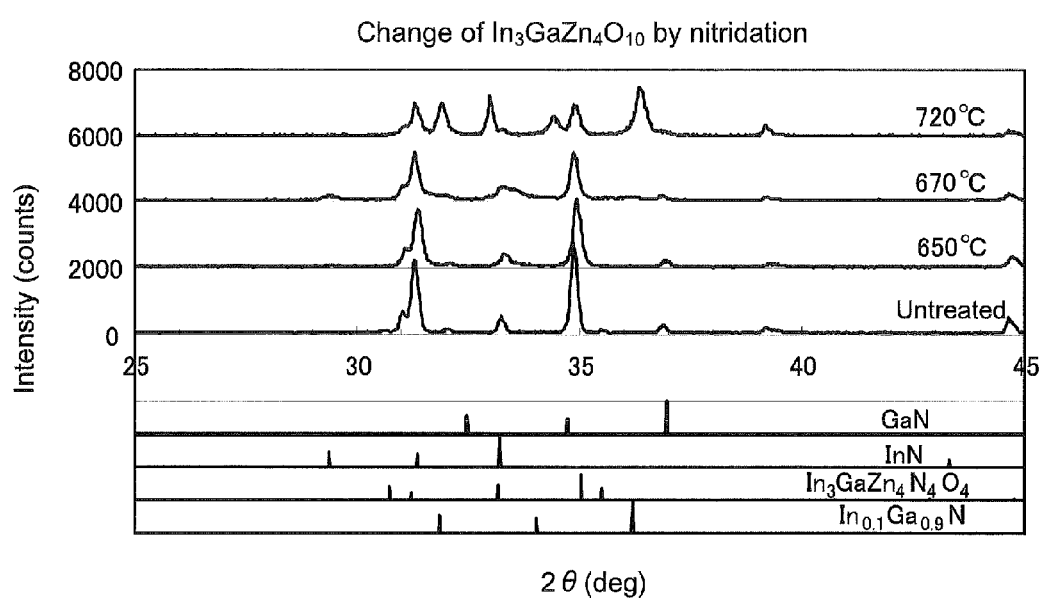
FIG. 14 is a diagram showing the XRD chart of an optical semiconductor in Example 3 of the present invention.

FIG. 14 shows the results of the XRD structural analysis before and after the nitridation. The upper part shows the data of the obtained compositions. The lower part shows the database of the materials. When the nitridation temperature was 650° C., no change was observed in the peaks before and after the nitridation. In contrast, when the nitridation temperature was 670° C. or higher, a new peak appeared. When the nitridation temperature was 720° C., peaks of $In_{0.1}Ga_{0.9}N$ appeared. This reveals that $In_3GaZn_4O_{10}$ was decomposed at a nitridation temperature of 720° C.

(UV-Vis Diffuse Reflectance Spectra)

Figure 15:
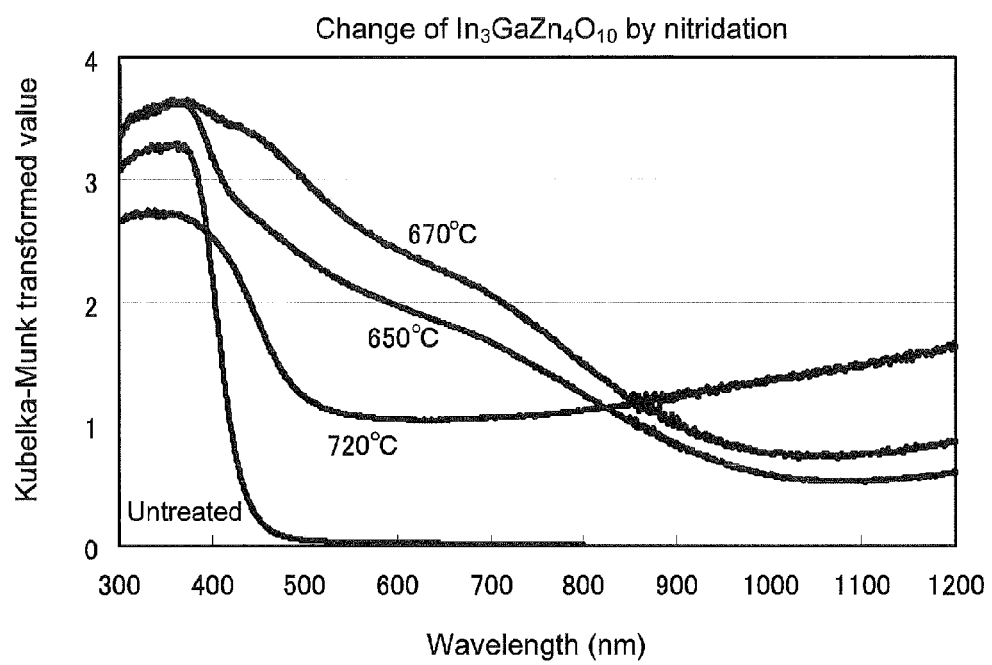
FIG. 15 is a diagram showing the UV-vis diffuse reflectance spectra of an optical semiconductor in Example 3 of the present invention.

FIG. 15 shows the results of the UV-vis diffuse reflectance spectra observed before and after nitridation. It is found that a new absorption appeared in the region of 400 to 1000 nm when the nitridation temperature was 650 to 670° C. In contrast, when the nitridation temperature was 720° C., the absorption in the region of 600 to 1000 nm disappeared and the absorption around 500 nm was still observed. Presumably, this absorption is attributed to the presence of $In_{0.1}Ga_{0.9}N$.

(Discussion)

For $In_3GaZn_4O_{10}$ (x=3/4), when the nitridation temperature was 650° C., only a peak shift was observed in the XRD analysis and no new peak appeared. In view of this, it is considered that the substitution by nitrogen occurred at a doping level. However, when the nitridation temperature was 670° C., the peaks shifted toward the high-angle side and a new peak also appeared in the XRD analysis. Furthermore, no absorption edge of the oxide was observed around 400 nm. For these reasons, it is considered that the oxide was nitrided into an oxynitride. On the other hand, when the nitridation temperature was 720° C., the GaN and InN peaks appeared and the absorption was blue-shifted in the XRD analysis. From these results, it is presumed that $In_3GaZn_4O_{10}$ (x=3/4) was phase-separated and Zn was sublimed, so that a mixture containing $In_{0.1}Ga_{0.9}N$ was obtained. Therefore, it was confirmed that it is desirable to nitride an oxide represented by $In_{2x}Ga_{2(1-x)}O_3(ZnO)_y$, where x=3/4 and y=2 are satisfied, at 650 to 670° C., more desirably at 670° C., to nitride the oxide so as to synthesize the composition of the present invention.

Figure 16:
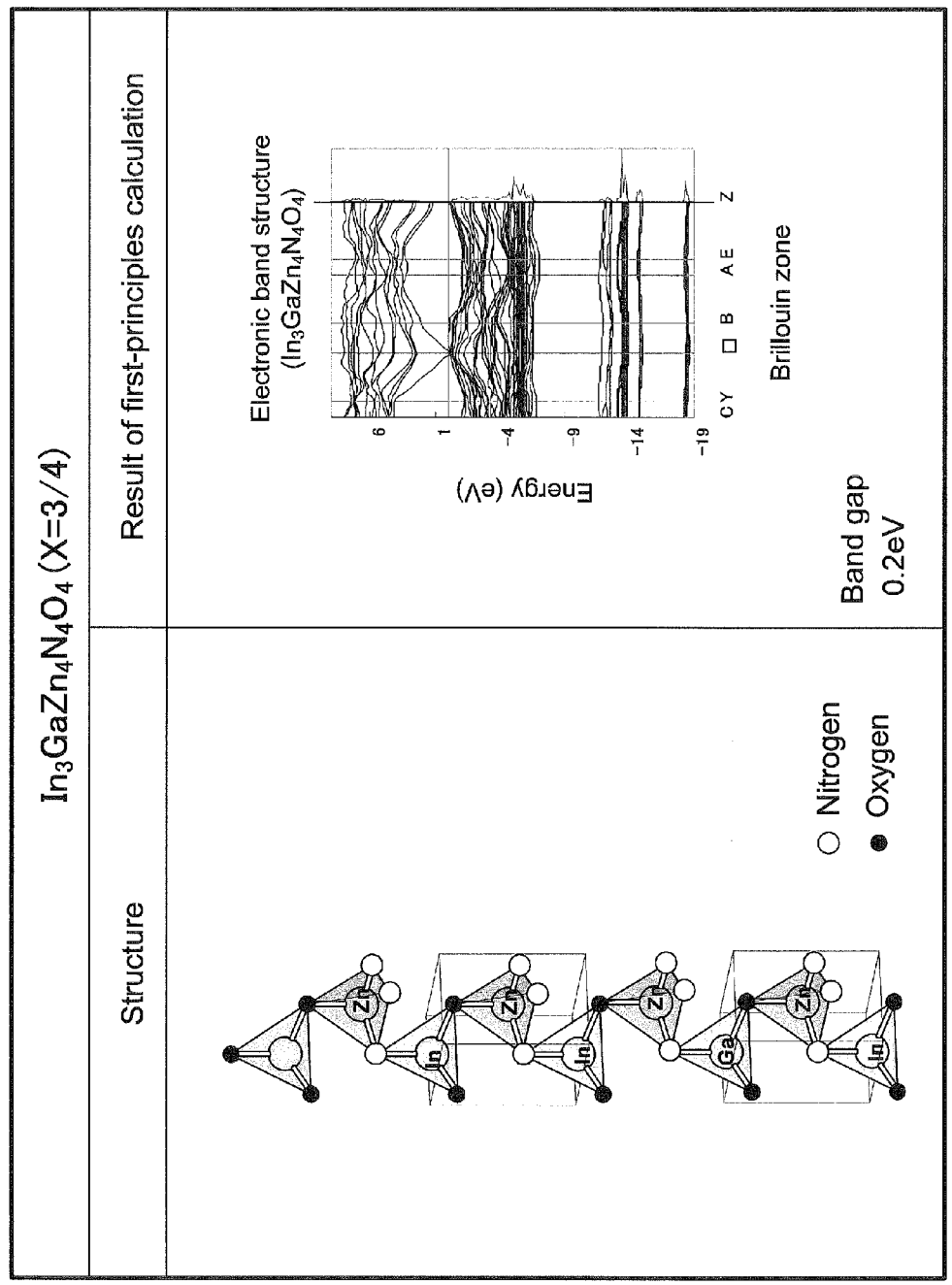
FIG. 16 is a diagram showing the crystal structure and the first-principles calculation result of an optical semiconductor obtained by substituting a part of oxygen in $In_3GaZn_4O_{10}$ by nitrogen.

This phenomenon is described. In the case where $In_3GaZn_4O_{10}$ (x=3/4) is converted into an oxynitride, if all the component cations In, Ga and Zn ions have the same wurtzite crystal structure, they can form a solid solution and the solid solution is stabilized. For that purpose, Ga ions, In ions, and Zn ions are required to be GaN, InN, and ZnO, respectively. That is, it is presumed that $In_3GaZn_4N_4O_4$ has a stable structure. Furthermore, the band gap of $In_3GaZn_4N_4O_4$ was calculated by the first-principles calculation. FIG. 16 shows the result. The structure shown in FIG. 16 is found to be a stable structure because its band gap can be calculated, although it is very different from the actual measured value obtained from the UV-vis diffuse reflectance spectrum. Therefore, the oxynitride obtained at a nitridation temperature of 720° C. is presumably $In_3GaZn_4N_4O_4$.

Example 4

Photoelectrochemical Cell

In Example 4, a photoelectrochemical cell having the configuration shown in FIG. 4 was produced. The photoelectrochemical cell 100 of the present example is described with reference to FIG. 4.

As shown in FIG. 4, the photoelectrochemical cell 100 of the present example includes the rectangular glass container 110 with an opening in the upper part, the semiconductor electrode 120 and the counter electrode 130. The glass container 110 contains 1 mol/L of an $H_2SO_4$ aqueous solution as the electrolyte 140.

The optical semiconductor electrode 120 was produced according to the following procedure. A 150-nm-thick ITO film (sheet resistance 10 Ω/sq.) was formed on a 1-cm-square glass substrate by sputtering, as the conductive substrate 121. Next, the optical semiconductor layer 124 was formed on the conductive substrate 121. The optical semiconductor layer 124 was produced by reactive sputtering using an $InGaZn_2O_5$ target at a nitrogen pressure of 0.1 Pa in the chamber. Thereby, a 500-nm-thick optical semiconductor layer 124 composed of a composition in which a part of oxygen in $InGaZn_2O_5$ was substituted by nitrogen was produced. The optical semiconductor electrode 120 was disposed so that the surface of the optical semiconductor layer 124 faced the light incident surface 112 of the glass container 110.

A platinum plate was used as the counter electrode 130. The conductive substrate 121 of the optical semiconductor electrode 120 was connected electrically to the counter electrode 130 by the conducting wire 150. The current flowing between the optical semiconductor electrode 120 and the counter electrode 130 was measured with an ammeter 160.

Example 5

A photoelectrochemical cell of Example 5 was produced in the same manner as in Example 4, except that the optical semiconductor 124 was produced in a different manner. In order to produce the optical semiconductor 124 of Example 5, a 150-nm-thick $InGaZn_2O_5$ was first produced by sputtering using an $InGaZn_2O_5$ target at a partial pressure of oxygen of 0.1 Pa in the chamber. Then, a 500-nm-thick composition, in which a part of oxygen was substituted by nitrogen, was formed by reactive sputtering using an $InGaZn_2O_5$ target at a nitrogen pressure of 0.1 Pa in the chamber.

Example 6

A photoelectrochemical cell of Example 6 was produced in the same manner as in Example 4, except that the optical semiconductor 124 was produced in a different manner. The procedure of producing the optical semiconductor 120 of Example 6 is as follows.

First, the conductive substrate 121 was produced. A 800-nm-thick InGaZn$_2$O$_5$ film was produced on a 1-cm-square sapphire substrate by sputtering using an InGaZn$_2$O$_5$ target at a partial pressure of oxygen of 0.1 Pa in the chamber. The obtained substrate with the InGaZn$_2$O$_5$ film was used as the conductive substrate 121.

Next, the optical semiconductor layer 124 was produced. The conductive substrate 121 including the 800-nm-thick InGaZn$_2$O$_5$ film formed thereon was put into an alumina boat. This was placed in the center of a quartz tube with an inner diameter of 50 mm and a length of 1000 mm. Then, a portion of the quartz tube with a length of 150 mm each from the center thereof was heated at 650° C. for 2 hours in a tube furnace, with ammonia flowing in the quartz tube at 1 L/min. Thereby, a portion of the 800-nm-thick InGaZn$_2$O$_5$ film, from the surface to a depth of about 500 nm, was converted into a composition in which a part of oxygen was substituted by nitrogen. The thickness of the composition in which a part of oxygen was substituted by nitrogen was obtained from the observation of the cross-sectional SEM image of the obtained film.

(Simulated Sunlight Irradiation Experiment)

A solar simulator manufactured by SERIC Ltd. was used to apply simulated sunlight. The surface of the optical semiconductor layer 124 in the optical semiconductor electrode 120 of each of the photoelectrochemical cells 100 of Examples 4 to 6 was irradiated with light at an intensity of 1 kW/m$^2$ through the light incident portion 121 of the photoelectrochemical cell 100. The gas generated on the surface of the counter electrode 130 was collected for 30 minutes, and the components of the collected gas were analyzed and the amount of gas generated was determined by gas chromatography. The photocurrent flowing between the optical semiconductor electrode 120 and the counter electrode 130 was measured with the ammeter 160. The apparent quantum efficiency was calculated using the amount of gas generated in the counter electrode 130.

The apparent quantum efficiency was calculated using the following formula:

Apparent quantum efficiency={(measured photocurrent density [mA/cm$^2$])/(photocurrent density obtainable by the sunlight that can be absorbed in the band gap of the material used for the surface near-field region of the optical semiconductor layer [mA/cm$^2$])}×100

Table 1 shows the apparent quantum efficiency measured for each of the photoelectrochemical cells 100 of Examples 4 to 6 and the measurement results of the Fermi levels of each optical semiconductor layer 124. The Fermi levels shown in Table 1 are the values obtained by measuring the potentials at which the photocurrent is 0, that is, the flat band potentials.

TABLE 1

| | | Optical semiconductor layer | | |
| --- | --- | --- | --- | --- |
| | | Surface near-field region | Junction plane near-field region with conductive substrate | Apparent quantum efficiency |
| Example 4 | Material composition | Composition in which a part of oxygen in InGaZn$_2$O$_5$ is substituted by nitrogen | Composition in which a part of oxygen in InGaZn$_2$O$_5$ is substituted by nitrogen | 3% |
| | Fermi level | −4.34 eV | −4.34 eV | |
| Example 5 | Material composition | Composition in which a part of oxygen in InGaZn$_2$O$_5$ is substituted by nitrogen | InGaZn$_2$O$_5$ | 10% |
| | Fermi level | −4.34 eV | −4.24 eV | |
| Example 6 | Material composition | Composition in which a part of oxygen in InGaZn$_2$O$_5$ is substituted by nitrogen | InGaZn$_2$O$_5$ | 15% |
| | Fermi level | −4.44 eV | −4.24 eV | |

Table 1 shows that photocurrents were observed in Examples 4 to 6. Table 1 also shows that the quantum efficiency was increased by the effect of charge separation in Examples 5 and 6. Furthermore, the quantum efficiency was further increased in Example 6 presumably because the conductive substrate is composed of InGaZn$_2$O$_5$, the Fermi level of the composition in which a part of oxygen in InGaZn$_2$O$_5$ is substituted by nitrogen is low, and further the composition has a gradient.

INDUSTRIAL APPLICABILITY

The optical semiconductor, optical semiconductor electrode, photoelectrochemical cell and energy system of the present invention can improve the quantum efficiency of the hydrogen evolution reaction by irradiation with light, and thus are useful for a power generation system for home use and the like.

The invention claimed is:

1. An optical semiconductor comprising In, Ga, Zn, O and N, the optical semiconductor having a composition in which a part of O is substituted by N in a general formula: In$_{2x}$Ga$_{2(1-x)}$O$_3$(ZnO)$_y$, wherein x and y satisfy 0.5≤x<1 and 0.5≤y, and includes a crystal phase comprising InN, GaN, and ZnO.

2. The optical semiconductor according to claim 1, wherein x is 0.5 in the general formula.

3. The optical semiconductor according to claim 2, wherein y is 1 or more and 6 or less in the general formula.

4. The optical semiconductor according to claim 3, wherein y is 2 or 6 in the general formula.

5. The optical semiconductor according to claim 1, having a wurtzite crystal structure.

6. A photoelectrochemical cell, comprising:
an optical semiconductor electrode including: a conductive substrate; and an optical semiconductor layer disposed on the conductive substrate and containing the optical semiconductor according to claim 1;
a counter electrode connected electrically to the conductive substrate;
a water-containing electrolyte in contact with surfaces of the optical semiconductor layer and the counter electrode; and
a container containing the optical semiconductor electrode, the counter electrode, and the electrolyte, wherein the photoelectrochemical cell generates hydrogen when the optical semiconductor layer is irradiated with light.

7. An energy system, comprising:
the photoelectrochemical cell according to claim 6;
a hydrogen storage, connected to the photoelectrochemical cell by a first pipe, for storing hydrogen generated in the photoelectrochemical cell; and
a fuel cell, connected to the hydrogen storage by a second pipe, for converting hydrogen stored in the hydrogen storage into electricity.

8. An optical semiconductor electrode, comprising:
a conductive substrate; and
an optical semiconductor layer disposed on the conductive substrate,
wherein in the optical semiconductor layer, a junction plane near-field region of the optical semiconductor layer with the conductive substrate is composed of a composition A represented by a general formula: $In_{2x}Ga_{2(1-x)}O_3(ZnO)_y$, wherein x and y, satisfy $0.2<x<1$ and $0.5 \leq y$,
a surface near-field region of the optical semiconductor layer is composed of a composition B having a composition in which a part of O is substituted by N in the general formula to include a crystal phase comprising InN, GaN, and ZnO, and
a Fermi level of the composition A is higher than a Fermi level of the composition B.

9. The optical semiconductor electrode according to claim 8, wherein x is 0.5 in the general formula.

10. The optical semiconductor electrode according to claim 9, wherein y is 1 or more and 6 or less in the general formula.

11. The optical semiconductor electrode according to claim 10, wherein y is 2 or 6 in the general formula.

12. The optical semiconductor electrode according to claim 8, wherein the composition B has a wurtzite crystal structure.

13. The optical semiconductor electrode according to claim 8, wherein the optical semiconductor layer is formed of: a first layer disposed on the conductive substrate and containing the composition A; and a second layer disposed on the first layer and containing the composition B.

14. The optical semiconductor electrode according to claim 8, wherein in the optical semiconductor layer, a concentration of nitrogen element increases from the junction plane near-field region to the surface near-field region along a thickness direction of the optical semiconductor layer.

15. A photoelectrochemical cell, comprising:
the optical semiconductor electrode according to claim 8;
a counter electrode connected electrically to the conductive substrate of the optical semiconductor electrode;
a water-containing electrolyte in contact with surfaces of the optical semiconductor layer of the optical semiconductor electrode and the counter electrode; and
a container containing the optical semiconductor electrode, the counter electrode, and the electrolyte,
wherein the photoelectrochemical cell generates hydrogen when the optical semiconductor layer is irradiated with light.

16. An energy system, comprising:
the photoelectrochemical cell according to claim 15;
a hydrogen storage, connected to the photoelectrochemical cell by a first pipe, for storing hydrogen generated in the photoelectronchemical cell; and
a fuel cell, connected to the hydrogen storage by a second pipe, for converting hydrogen stored in the hydrogen storage into electricity.

* * * * *